US008856686B2

(12) United States Patent
Li

(10) Patent No.: US 8,856,686 B2
(45) Date of Patent: Oct. 7, 2014

(54) METHOD AND APPARATUS FOR GENERATING A MENU DISPLAY

(75) Inventor: Rui Li, Singapore (SG)

(73) Assignee: TP Vision Holding B.V., Eindhoven (NL)

( * ) Notice: Subject to any disclaimer, the term of this patent is extended or adjusted under 35 U.S.C. 154(b) by 0 days.

(21) Appl. No.: 13/258,518

(22) PCT Filed: Mar. 30, 2010

(86) PCT No.: PCT/IB2010/051366
§ 371 (c)(1),
(2), (4) Date: Sep. 22, 2011

(87) PCT Pub. No.: WO2010/116285
PCT Pub. Date: Oct. 14, 2010

(65) Prior Publication Data
US 2012/0023452 A1    Jan. 26, 2012

(30) Foreign Application Priority Data
Apr. 6, 2009    (EP) .................................... 09157378

(51) Int. Cl.
*G06F 3/048* (2013.01)
*G06F 3/0482* (2013.01)
*H04N 5/445* (2011.01)
*H04N 21/431* (2011.01)
*H04N 21/45* (2011.01)

(52) U.S. Cl.
CPC .......... *G06F 3/0482* (2013.01); *H04N 5/44543* (2013.01); *H04N 21/4312* (2013.01); *H04N 21/4532* (2013.01)
USPC ........... 715/845; 715/810; 715/811; 715/825; 715/764; 715/765

(58) Field of Classification Search
None
See application file for complete search history.

(56) References Cited

U.S. PATENT DOCUMENTS

| | | | | |
|---|---|---|---|---|
| 5,261,042 A | * | 11/1993 | Brandt | 715/841 |
| 5,821,936 A | * | 10/1998 | Shaffer et al. | 715/810 |
| 6,263,217 B1 | * | 7/2001 | Park | 455/566 |
| 6,618,039 B1 | | 9/2003 | Grant et al. | |

(Continued)

FOREIGN PATENT DOCUMENTS

| | | |
|---|---|---|
| EP | 0891066 A2 | 1/1999 |
| EP | 1067453 A1 | 1/2001 |
| JP | 08186774 | 7/1996 |
| JP | 2007164655 A | 6/2007 |

OTHER PUBLICATIONS

MZNT Browser 1.2, 4 Page Article on Web Browzers, Downloaded From    http://software.techrepublic.com.com/abstract.aspx?docid=762871, Jan. 21, 2009.

(Continued)

*Primary Examiner* — Ryan Pitaro
*Assistant Examiner* — Mahelet Shiberou
(74) *Attorney, Agent, or Firm* — Shimokaji & Associates, P.C.

(57) ABSTRACT

A method of generating a menu display (203), the method comprising the steps of: selecting a plurality of menu items (205_1, 205_2, 205_3, 205_4) from a plurality of candidate menu items, the candidate menu items being arranged in a plurality of hierarchical levels, on the basis of most frequently used menu items and most difficult to access menu items within the plurality of hierarchical levels; and displaying the selected menu items simultaneously.

13 Claims, 4 Drawing Sheets

(56) References Cited

U.S. PATENT DOCUMENTS

| | | | |
|---|---|---|---|
| 8,122,375 B2* | 2/2012 | Ito | 715/811 |
| 2002/0054146 A1* | 5/2002 | Fukumoto et al. | 345/810 |
| 2003/0169300 A1* | 9/2003 | Colgrove | 345/810 |
| 2004/0080547 A1* | 4/2004 | Goto | 345/827 |
| 2004/0100505 A1* | 5/2004 | Cazier | 345/811 |
| 2004/0221242 A1* | 11/2004 | Chen et al. | 715/810 |
| 2005/0076309 A1* | 4/2005 | Goldsmith | 715/811 |
| 2006/0191011 A1* | 8/2006 | Korkishko et al. | 726/24 |
| 2006/0218499 A1* | 9/2006 | Matthews et al. | 715/765 |
| 2007/0242058 A1* | 10/2007 | Yamada | 345/173 |
| 2008/0060012 A1 | 3/2008 | Rydenhag | |
| 2008/0263024 A1* | 10/2008 | Landschaft et al. | 707/5 |
| 2008/0279048 A1* | 11/2008 | Wakamiya et al. | 368/10 |
| 2009/0019396 A1* | 1/2009 | McCarthy | 715/827 |
| 2009/0083663 A1* | 3/2009 | Kim | 715/811 |

OTHER PUBLICATIONS

Apple- iTunes-What's on iTunes?-Podcasts_FAQ: 4 Page Article on Podcasts; Downloaded From http://www.apple.com/iTunes/whatson/podcasts.fanfaq.html, on Jan. 21, 2009.

* cited by examiner

METHOD AND APPARATUS FOR GENERATING A MENU DISPLAY

FIELD OF THE INVENTION

The present invention relates to method and apparatus for generating a menu display. In particular, but not exclusively, it relates to generating a quick link system for a user interface.

BACKGROUND OF THE INVENTION

Devices such as personal computers (PCs) and televisions (TVs) have increasing functionality which require increasingly complex user interface devices to enable user access. This often requires complex menu options from which a user can select. These means are usually arranged hierarchically with an increasing number of levels and complexity. This makes access difficult, cumbersome and slow to the user. In particular, in trying to locate require menu items at ever increasing lower levels within the hierarchy of menu items.

For example, as shown in FIG. 1, menu items 101_1, 101_2, 101_3, 101_4 are arranged in a first level 101. Menu item 101_1 has two menu items 103_1, 103_2 in a second, lower level 103 and menu item 101_2 has three menu items 105_1, 105_2, 105_3 in the second level 103. Menu item 103_1 has three menu items 107_1, 107_2, 107_3 in a third, lower level 107 and menu item 105_3 has three menu items 109_1, 109_2, 109_3 in the third level 107. If the user interface is currently displaying menu items 107_1, 107_2, 107_3 and the user next wishes to select menu item 109_2, the user must go back up the level to the first level 101, select menu item 101_2 and then proceed back down the levels to the third level 107 and display menu items 109_1, 109_2, 109_3. If the depth of the hierarchical levels is large, this operation becomes very time consuming and difficult for the user to access a particular function of the device.

Many solutions have been proposed for overcoming this. One solution is to provide a quick link system in which menu items which are most frequently used are displayed in first instance such as that disclosed by JP08-186774, for example, or short-cuts which can be programmed by the user as disclosed by U.S. Pat. No. 6,618,039, for example. However, these solutions when used in very complex hierarchies do not enable quick access to items at lower levels unless they are frequently used and hence appear in the "quick link" menu list or have been programmed as a short cut by the user.

SUMMARY OF THE INVENTION

The present invention seeks to provide a menu display in which items can be quickly and efficiently accessed.

This is achieved according to a first aspect of the present invention by a method of generating a menu display, the method comprising the steps of: selecting a plurality of menu items from a plurality of candidate menu items, the candidate menu items being arranged in a plurality of hierarchical levels, on the basis of most frequently used menu items and most difficult to access menu items within the plurality of hierarchical levels; and displaying the selected menu items simultaneously.

This is also achieved according to a second aspect of the present invention by apparatus for generating a menu display comprising: a processor for selecting a plurality of menu items from a plurality of candidate menu items, the candidate menu items being arranged in a plurality of hierarchical levels, on the basis of most frequently used menu items and most difficult to access menu items within the plurality of hierarchical levels; and a display for displaying the selected menu items simultaneously.

In this way a display of menu items is provided in which the items have been selected on the basis of frequency of use as well as difficulty of access such that frequently used, lower level items can be displayed in a quick access menu.

In an embodiment of the present invention, the method further comprises maintaining a count of use of each menu item, and wherein the step of selecting a plurality of menu items comprises selecting a plurality of menu items on the basis of menu items having at least the highest counts of use. In this way a record of the most frequently used can be easily maintained.

Further, the step of selecting a plurality of menu items may comprise selecting a plurality of menu items on the basis of menu items in at least the lowest hierarchical levels such that the most difficult to access menu items are taken into consideration.

The display of the selected menu items may be continuously updated so that as most frequently used and most difficult to access is updated the menu items selected for display can be updated.

The method may further comprise weighting each menu item on the basis of frequency of use and degree of difficulty of access of menu items within the plurality of hierarchical levels, and wherein the step of selecting a plurality of menu items comprises selecting a plurality of menu items on the basis of the weighting. This provides a simple yet effective technique of selecting the menu items.

In particular, the weighted menu items may be stored in a storage device and the content continuously updated.

The weighted menu items in a storage device may be time stamped and the step of continuously updating content of the storage device may comprise replacing the oldest menu items with new menu items. Alternatively, the storage device may comprise a FIFO buffer in which items are shifted into the buffer and older items removed as new items are added. The step of storing a number of entries of each menu item in the storage device and the step of selecting a plurality of menu items may comprise selecting menu items having at least the highest number of entries in the storage device. This provides a simple technique of weighting the items for selection.

BRIEF DESCRIPTION OF DRAWINGS

For a more complete understanding of the present invention, reference is made to the following description in conjunction with the accompanying drawings, in which.

DETAILED DESCRIPTION OF AN EMBODIMENT OF THE INVENTION

Figure 2:
FIG. 2 is an example of a display of a user interface device according to an embodiment of the present invention.

FIG. 2 shows a display 200 of menu items on a computer, TV screen or the like.

The display 200 comprises a main display 201 of menu items which can be navigated by the user using selection keys or a pointer or the like. The display 200 also comprises a quick link display 203 of menu items 205_1, 205_2, 205_3, 205_4.

These menu items 205_1, 205_2, 205_3, 205_4 are selected from a plurality of candidate menu items on the basis of most frequently used menu items and most difficult to access menu items and displayed on the display 200. Although in this embodiment these selected menu items 205_1, 205_2, 205_3, 205_4 are illustrated as displayed at the top of the display, it can be appreciated that these can be listed down the sides of the display and/or across the bottom of the display 200, for example.

Figure 3:
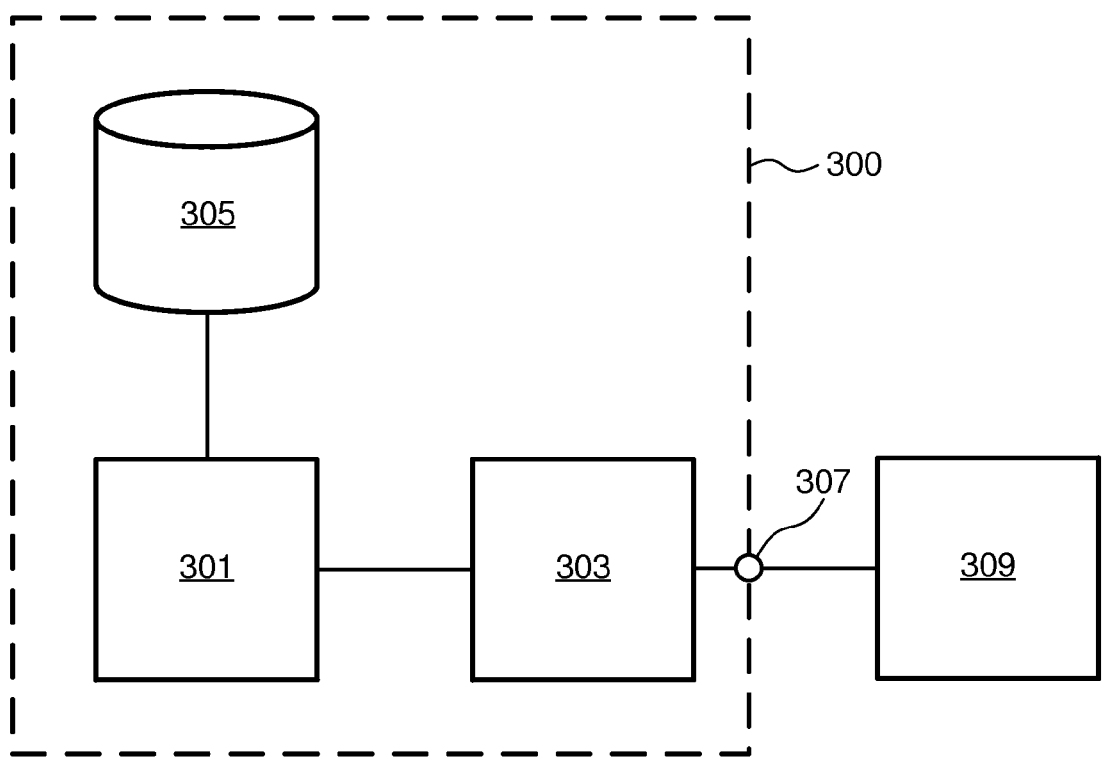
FIG. 3 is a simplified block diagram of apparatus according to an embodiment of the present invention.

With reference to FIG. 3, the apparatus 300, for generating a menu such as a quick link menu, for example, comprises a processor 301 connected to a driver 303 and a storage device 305, such as a memory, buffer, or the like. The driver 303 is connected to a display 309. The display 309 may be an integral part of the apparatus 300 or separate and connected to an output terminal 307 connected to the output of the driver 303 as shown in FIG. 3.

Figure 4:
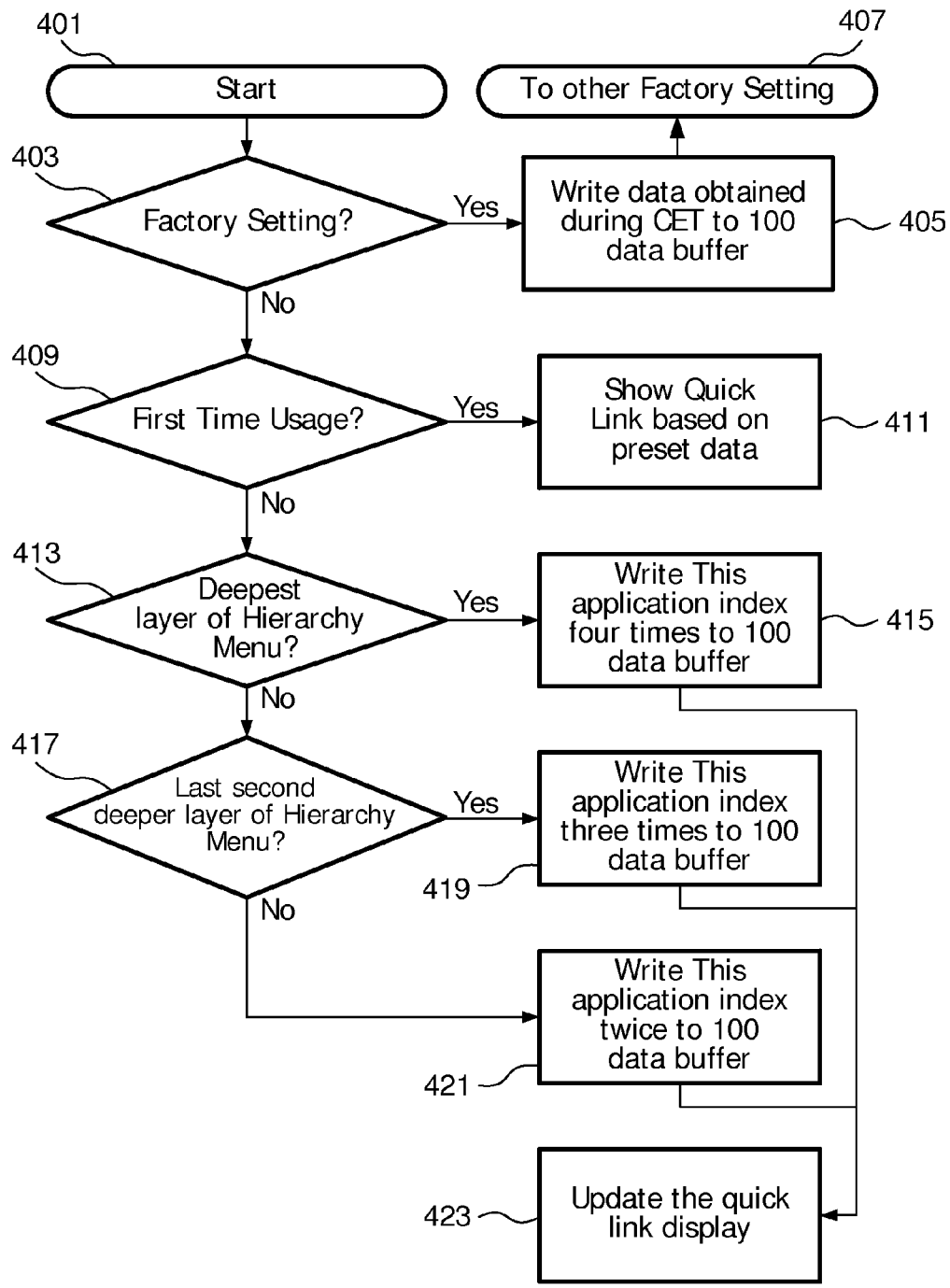
FIG. 4 is a flowchart of the method according to an embodiment of the present invention.

The method of generating the quick link menu display 203 is illustrated in FIG. 4.

At the beginning, step 401, the quick link menu items 205_1, 205_2, 205_3, 205_4 are preset based on consumer experience test result. If the factory settings or pre-settings are to be used, step 403, these pre-settings are written into the buffer 305 by the processor 301. The method also allows for the input of other settings, such as RGB gain value, white balance, smart picture setting, smart sound setting, screen format etc, step 407.

The buffer 305 stores 100 data entries based on a percentage. For example, if the menu item "Watch TV" 205_1 is found to be used 32% during consumer experience test, then the "Watch TV" item is stored in the buffer in 32 entries. On the basis of the menu items stored in the buffer 305, the processor 301 displays these stored menu items on the display 303 in a quick link menu display 203. The items within the quick link menu display 203 may be displayed in a priority order. For example, the menu item having the highest number of buffer entries, e.g. "Watch TV", is located on the far left part of the quick link system. When the user switches to quick link menu 203, this first menu item is highlighted. The menu item having the second highest number of buffer entry is located to the right next to the previous one and can be selected next through moving a cursor key. This is repeated until all quick link menu items are displayed.

When the device is used for the first time, step 409, the quick link menu 203 is displayed on the display 303 based on the preset data values stored in the buffer 305, step 411. The processor 301 then monitors the activities of the user. In a specific example, shown in FIG. 4, the user accesses a menu item in the deepest layer of the hierarchy, for example, menu item 109_2 shown in FIG. 1, step 413. This item is then weighted by storing the item four times in the data buffer, step 415, and at the same time removing the oldest four items in the data buffer 305. The oldest items are recognised by time stamps or by their relevant location in the buffer, for example, the remaining items may be shifted into the buffer so that the oldest are at the opposite end of new entries being added, as in a FIFO buffer.

Figure 1:
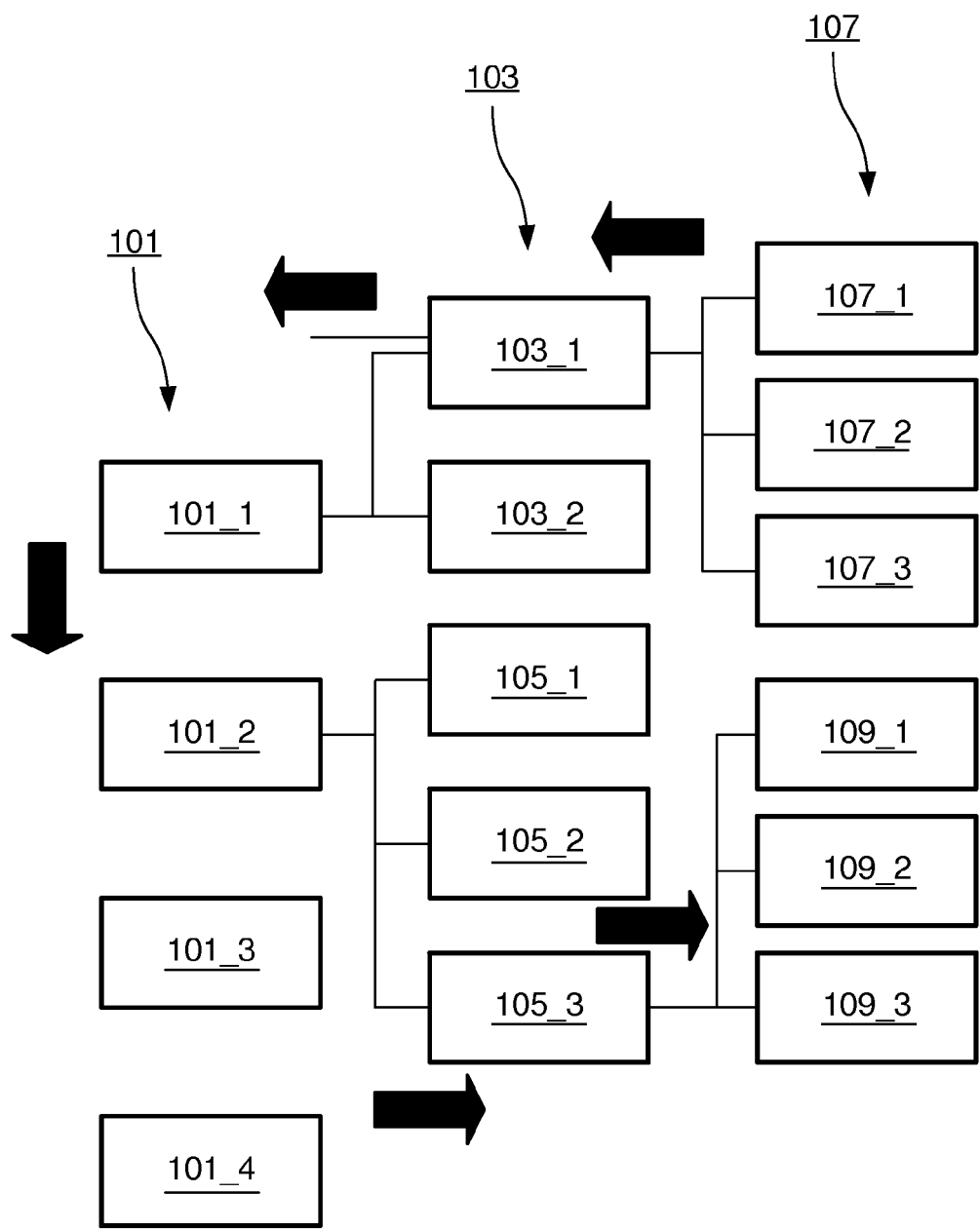
FIG. 1 is a simplified schematic of an example of a known menu display.

In another example, user accesses item 103_2 in the second deepest layer 103 of the hierarchy menu of FIG. 1, step 417. This item is then weighted by storing it three times in the data buffer 305, step 419, and at the same time removing the oldest three items in the data buffer.

In the example shown in FIG. 4, all other menu items are weighted by storing them in the data buffer twice and at the same time removing the oldest two items in the data buffer, step 429.

As the user uses the menu and selects an item, the buffer entries are altered, the quick link menu items are thus updated, step 423, so that they are always based on the data buffer content.

As a result, the most difficult accessed as well as frequently used menu items, and hence application/function, can be quickly accessed.

Although an embodiment of the present invention has been illustrated in the accompanying drawings and described in the foregoing detailed description, it will be understood that the invention is not limited to the embodiment disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of generating a menu display, the method comprising:
    weighting each menu item of a main display of menu items arranged in a plurality of hierarchical levels on a basis of frequency of use and a degree of difficulty of access of the menu items within said plurality of hierarchical levels based on level depth of one of the menu items within said plurality of hierarchical levels, wherein the degree of difficulty of accessing any given menu item increases in proportion to the depth of the respective menu item within the plurality of hierarchical levels;
    accessing a plurality of candidate menu items from the main display of menu items including selecting a plurality of menu items for display on the basis of said weighting;
    displaying the main display of menu items along with a link menu of selected accessed candidate menu items, the menu items selected for display based on said weighting; and
    repeating the step of weighting each menu item and, in response, updating the menu items selected for display.

2. The method according to claim 1, wherein weighting each menu item comprises maintaining a count of use of each menu item, and wherein accessing the plurality of candidate menu items is based on menu items having at least the highest counts of use.

3. The method according to claim 1, further comprising: continually accessing and displaying the plurality of candidate menu items.

4. The method according to claim 1, wherein the method further comprises:
    storing said weighted menu items in a storage device; and
    continuously updating content of said storage device.

5. The method according to claim 4, wherein the step of storing said weighted menu items in a storage device comprises time stamping each menu item, and wherein the step of continuously updating content of said storage device comprises replacing the oldest menu items with new menu items.

6. The method according to claim 4, wherein the step of weighting each menu item comprises the step of storing a number of entries of each menu item in said storage device, wherein the number of stored entries of each menu item is dependent on the hierarchal level of each menu item.

7. The method according to claim 6, including selecting menu items for display from the main display of menu items having at least the highest number of entries in the storage device.

8. A non-transitory computer-readable medium having instructions stored thereon which, when executed by a processor, cause the processor to perform:
   weighting each menu item of a main display of menu items arranged in a plurality of hierarchical levels on a basis of frequency of use and a degree of difficulty of access of the menu items within said plurality of hierarchical levels based on level depth of one of the menu items within said plurality of hierarchical levels, wherein the degree of difficulty of accessing any given menu item increases in proportion to the depth of the respective menu item within the plurality of hierarchical levels;
   accessing a plurality of candidate menu items from the main display of menu items including selecting a plurality of menu items for display on the basis of said weighting;
   displaying the main display of menu items along with a link menu of selected accessed candidate menu items selected based on greatest frequency of use and greatest depth in the plurality of hierarchical levels; and
   repeating the weighting of each menu item and, in response, updating the menu items selected for display.

9. An apparatus configured to generate a menu display comprising:
   a processor configured to:
   weight each menu item of a main display of menu items arranged in a plurality of hierarchical levels on a basis of frequency of use and a degree of difficulty of access of the menu items within said plurality of hierarchical levels based on level depth of one of the menu items within said plurality of hierarchical levels, wherein the degree of difficulty of accessing any given menu item increases in proportion to the depth of the respective menu item within the plurality of hierarchical levels; and
   access a plurality of candidate menu items from the main display of menu items including selecting a plurality of menu items for display on the basis of said weighting; and
   repeat the weighting of each menu item and, in response, updating the menu items selected for display; and
   a driver configured to drive a display to display the main display of menu items along with a link menu of accessed candidate menu items selected based on said weighting.

10. The apparatus according to claim 9 further comprising a storage device for storing a plurality of entries of menu items based on greatest frequency of use and greatest difficulty to access within said plurality of hierarchical levels, wherein said processor selects menu items for display along with the link menu having the highest number of entries in the storage device.

11. The apparatus of claim 9, wherein the apparatus is a user interface device.

12. The method of claim 1, wherein the menu items are selected for display based on being in the deepest layers of the hierarchy.

13. The method of claim 12, wherein the menu items are selected for display based on being the most frequently used menu items.

* * * * *